United States Patent
Drack et al.

(10) Patent No.: US 9,677,537 B2
(45) Date of Patent: Jun. 13, 2017

(54) ACOUSTIC SHIELD FOR NOISE REDUCTION IN WIND TURBINES

(71) Applicant: General Electric Company, Schenectady, NY (US)

(72) Inventors: Lorenz Edwin Drack, Munich (DE); Thierry Pascal Maeder, Munich (DE); Gowri Jaganathan Sengundermudaliar, Bangalore (IN); Karthickprabu Vijayakumar, Bangalore (IN)

(73) Assignee: General Electric Company, Niskayuna, NY (US)

( * ) Notice: Subject to any disclaimer, the term of this patent is extended or adjusted under 35 U.S.C. 154(b) by 566 days.

(21) Appl. No.: 13/852,562

(22) Filed: Mar. 28, 2013

(65) Prior Publication Data
US 2014/0294592 A1  Oct. 2, 2014

(51) Int. Cl.
*F03B 3/12* (2006.01)
*F03D 1/06* (2006.01)

(52) U.S. Cl.
CPC ........ *F03D 1/0633* (2013.01); *F05B 2240/30* (2013.01); *F05B 2260/96* (2013.01); *Y02E 10/721* (2013.01); *Y10T 29/49337* (2015.01); *Y10T 156/10* (2015.01)

(58) Field of Classification Search
CPC ...... F03D 1/06; F03D 1/00608; F03D 1/0633; F03D 1/065; F03D 1/0675; F03D 1/001; F03D 1/0641; F03D 1/0683; F05B 2240/30; F05B 2240/301; F05B 2240/302; F05B 2240/31; F05B 2240/34; F05B 2260/96; Y02E 10/721

USPC ......... 415/4.2, 4.5, 119; 416/224, 228, 235, 416/242, 243, 500, 175, 230, 203, 227 R, 416/231 B, 236 R, 237; 156/60; 29/889.71

See application file for complete search history.

(56) References Cited

U.S. PATENT DOCUMENTS

| | | | |
|---|---|---|---|
| 3,936,017 A | 2/1976 | Blythe et al. | |
| 6,505,706 B2 | 1/2003 | Tse | |
| 7,458,777 B2 | 12/2008 | Herr | |
| 7,637,721 B2 | 12/2009 | Driver et al. | |

(Continued)

OTHER PUBLICATIONS

Eric J Simley; "Development of an Acoustc Array for Wind Turbine Aeroacoustic Noise Analysis"; Thesis submitted to the Faculty of the Graduate School of the University of Colorado, Department of Electrical, Computer, and Energy Engineering 2010; 164 Pages.

(Continued)

*Primary Examiner* — Phutthiwat Wongwian
*Assistant Examiner* — Kelsey Stanek
(74) *Attorney, Agent, or Firm* — Nitin N. Joshi

(57) ABSTRACT

A wind blade is provided that includes a primary blade body defining a leading edge and a trailing edge and further defining a pressure side and a suction side joining along the trailing edge. The wind blade also includes a secondary blade having an aerodynamic contour defining a first surface and a second surface and coupled with the primary blade body for the purpose of shielding noise. The secondary blade body is disposed proximate to at least a portion of the trailing edge on at least one of the pressure side and the suction side of the primary blade body and may also improve overall performance of the wind blade.

13 Claims, 5 Drawing Sheets

(56) References Cited

U.S. PATENT DOCUMENTS

| | | |
|---|---|---|
| 7,900,868 B2 | 3/2011 | Sankrithi et al. |
| 7,959,412 B2 | 6/2011 | Bonnet |
| 8,834,127 B2 * | 9/2014 | Giguere ................ F03D 1/0633 416/228 |
| 2010/0143151 A1 * | 6/2010 | Kinzie et al. ................. 416/248 |
| 2011/0142666 A1 * | 6/2011 | Drobietz ............... F03D 1/0675 416/228 |
| 2012/0027590 A1 * | 2/2012 | Bonnet ............................ 416/1 |
| 2012/0119023 A1 | 5/2012 | Moore et al. |
| 2012/0134837 A1 | 5/2012 | Drobietz et al. |
| 2013/0129519 A1 * | 5/2013 | Nielsen ................ F03D 1/0633 416/228 |

OTHER PUBLICATIONS

Glahn et al., "Geometry Considerations for Jet Noise Shielding with CTOL Engine-Over-The-Wing Concept", NASA Technical Memorandum X-71562, Jun. 1974, 40 Pages.

* cited by examiner

ACOUSTIC SHIELD FOR NOISE REDUCTION IN WIND TURBINES

BACKGROUND

The present application relates generally to wind turbines and more particularly relates to noise attenuating systems for the reduction of noise produced during operation of wind turbine rotor blades.

During the operation of a wind blade with an airfoil-shaped section, the fluid, for example air, flows along the airfoil-shape forming a boundary layer. Generally the boundary layer is laminar in the proximity of a leading edge of the wind blade and transitions to a turbulent state over the body of the airfoil-shaped wind blade. During operation, the wind blade generates considerable noise, which is a major constraint in utilizing the wind turbines for power production as the noise may bother people in residential areas located nearby.

One cause of the noise generated during the operation of the wind blade is the interaction of a trailing edge of the airfoil-shaped wind blade with the turbulent flow in the turbulent boundary layer. A turbulent flow includes various groups of randomly oriented turbulent eddies of various sizes and intensities that are associated with a turbulent kinetic energy. Generally, the higher the turbulent kinetic energy associated with the turbulent eddies, and the closer the turbulent eddies are to a scattering edge, the higher the noise produced. Furthermore, groups of large eddies are associated with low frequency noise and groups of small eddies are associated high frequency noise. The distribution of eddy sizes, the proximity of eddies to scattering surfaces such as an airfoil, and the response of the human ear to noise determine perceived noise levels.

There is therefore a desire for a wind blade that generates less noise during operation while maintaining the aerodynamic performance of the wind turbine.

BRIEF DESCRIPTION

In accordance with an embodiment of the invention, a wind blade is provided. The wind blade includes a primary blade body defining a leading edge and a trailing edge and further defining a pressure side and a suction side joining along the trailing edge. The wind blade also includes a secondary blade having an aerodynamic contour defining a first surface and a second surface and coupled with the primary blade body for shielding noise, wherein the secondary blade body is disposed proximate to at least a portion of the trailing edge on at least one of the pressure side and the suction side of the primary blade body.

In accordance with an embodiment of the invention, a method of reducing noise in a wind turbine is provided. The method includes providing a primary blade body defining a leading edge and a trailing edge and further defining a pressure side and a suction side joining along the trailing edge. The method also includes disposing a secondary blade body having an aerodynamic contour proximate to one of at least a portion of the trailing edge and the leading edge on at least one of the pressure side and the suction side of the primary blade body.

In accordance with an embodiment of the invention, a wind turbine is provided. The wind turbine includes multiple wind blades, wherein each of the blades comprises a primary blade body defining a leading edge and a trailing edge and further defining a pressure side and a suction side joining along the trailing edge. Further, each of the blades includes a secondary blade body having an aerodynamic contour defining a first surface and a second surface and coupled with the primary blade body for shielding noise, wherein the secondary blade body is disposed proximate to one of at least a portion of the trailing edge and the leading edge on at least one of the pressure side and the suction side of the primary blade body.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. The terms "secondary blade body" and "acoustic shield" are used interchangeably and intended to mean the same element in the present invention. Any examples of operating parameters are not exclusive of other parameters of the disclosed embodiments.

Figure 1:
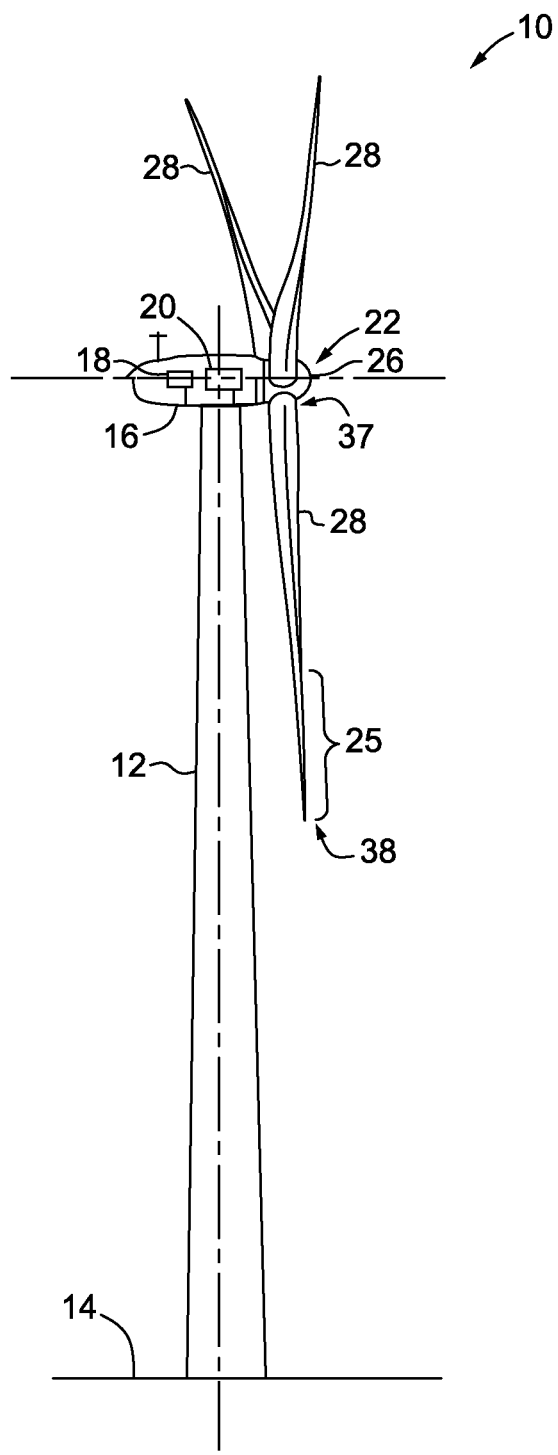
FIG. 1 is a side view of a wind turbine with a plurality of wind blades in accordance with an embodiment of the present invention.

FIG. 1 is a perspective view of an exemplary wind turbine 10 in accordance with an embodiment of the present invention. In this embodiment, the wind turbine 10 is a horizontal-axis wind turbine. Alternatively, the wind turbine 10 may be a vertical-axis wind turbine. In the present embodiment, the wind turbine 10 includes a tower 12 that extends from a support surface 14, a nacelle 16 mounted on the tower 12, a generator 18 positioned within the nacelle 16, a gearbox 20 coupled to the generator 18, and a rotor 22 that is rotatably coupled to the gearbox 20 with a rotor shaft 24. The rotor 22 includes a rotatable hub 26 and a plurality of wind blades 28 coupled to and extending outward from the rotatable hub 26. Each of the wind blades 28 includes a primary blade body (shown as 29 in FIG. 2) and an acoustic shield referred to as a secondary blade body (shown as acoustic shield 40 in FIG. 2) for reducing noise.

Figure 2:
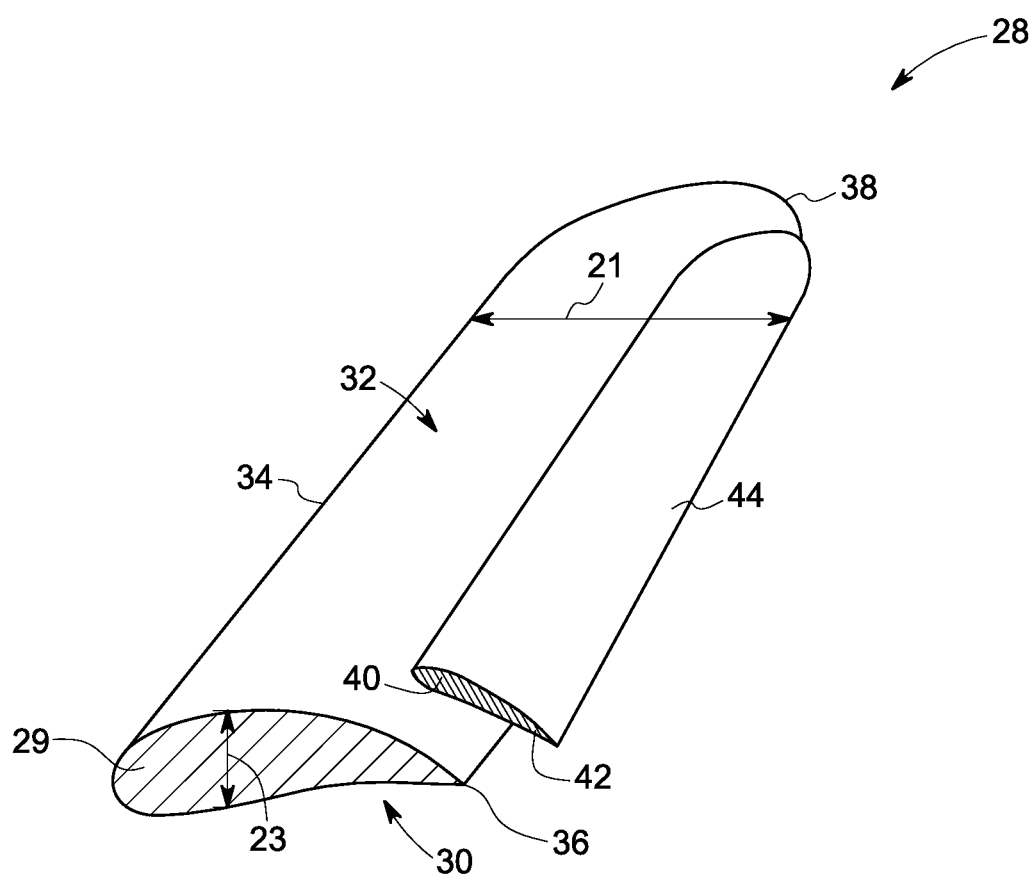
FIG. 2 is a perspective view of a portion of a wind blade with a secondary blade body or an acoustic shield on a suction side in accordance with an embodiment of the present invention.

FIG. 2 is a perspective view of a portion of the wind blade 28 in accordance with an embodiment of the present invention. The wind blade 28 includes the primary blade body 29 having a pressure side 30 and a suction side 32 extending between a leading edge 34 and a trailing edge 36, and may extend from a blade tip region 38 to a blade root 37 (shown in FIG. 1). The exterior surfaces of the wind blade 28 may be generally aerodynamic surfaces having generally aerodynamic contours, as is generally known in the art. The wind blade 28 also defines a chord 21 and a thickness 23 as shown, which varies in the chord-wise and span-wise directions of the wind blade 28. The wind blade 28 further includes the secondary blade body or the acoustic shield 40 coupled with the primary blade body 29 for shielding noise. The secondary blade body 40 includes an aerodynamic contour defining a first surface 42 and a second surface 44. In this embodiment, the first surface 42 of the secondary blade body 40 is coupled with the primary blade body 29 on the suction side 32. As shown in FIG. 2, the secondary blade body 40 (or acoustic shield) is disposed proximate to at least a portion of the trailing edge 36 of the primary blade body 28 such that the secondary blade body 40 (or acoustic shield) is slightly aft of the trailing edge 36. Further, the secondary blade body 40 (or acoustic shield) is disposed proximate to the blade tip region 38, thereby, causing reduction in noise due to shielding effect without affecting the boundary layer properties of fluid flowing over the wind blade 28. In one embodiment, the secondary blade body 40 (or acoustic shield) is disposed within one-third of an outer region (represented by element number 25 of FIG. 1) of the primary blade body 29 towards the blade tip region 38 of the wind blade 28. The blade tip region 38 of the wind blade 28 is faired with the secondary blade body 40 (or acoustic shield) for allowing a smooth flow of wind over the aerodynamic contour of the wind blade 28.

Furthermore, the first surface 42 of the secondary blade body 40 (or acoustic shield) is coupled with the primary blade body 29 using adhesive via a plurality of stents. Also, the coupling of the secondary blade body 40 (or acoustic shield) involves local reinforcement of the skins belonging to the primary and secondary blade bodies. In one embodiment, the secondary blade body may be configured to be retrofitted with the primary blade body 29. The secondary blade body or the acoustic shield 40 can be attached to the primary blade via short rod like structures made of metal, fiberglass or other material that can be glued to the structure or skin of the primary blade.

As shown in this embodiment in FIG. 2, the secondary blade body 40 includes a solid body with an airfoil shape. However, in another embodiment, the secondary blade body 40 (or acoustic shield) may include a thin shell structure. In one embodiment, either of the solid body or the thin shell structure of the secondary blade body, 40 (or acoustic shield) is made up of a material such as carbon fiber. Other non-limiting examples of the material of the secondary blade body 40 (or acoustic shield) include KEVLAR™ synthetic fiber, metal or composite or fiber glass. Further, the secondary blade body 40 (or acoustic shield) comprises a thickness to chord ratio in a range of about 0.03 to 0.08. The secondary blade body 40 (or acoustic shield) may also comprise a chord-wise thickness in a range of about 5% to 15% of the primary blade body 29. The profile of the secondary blade body or the acoustic shield could be a NACA12, or any other suitable airfoil section or distribution of sections.

Figure 3:
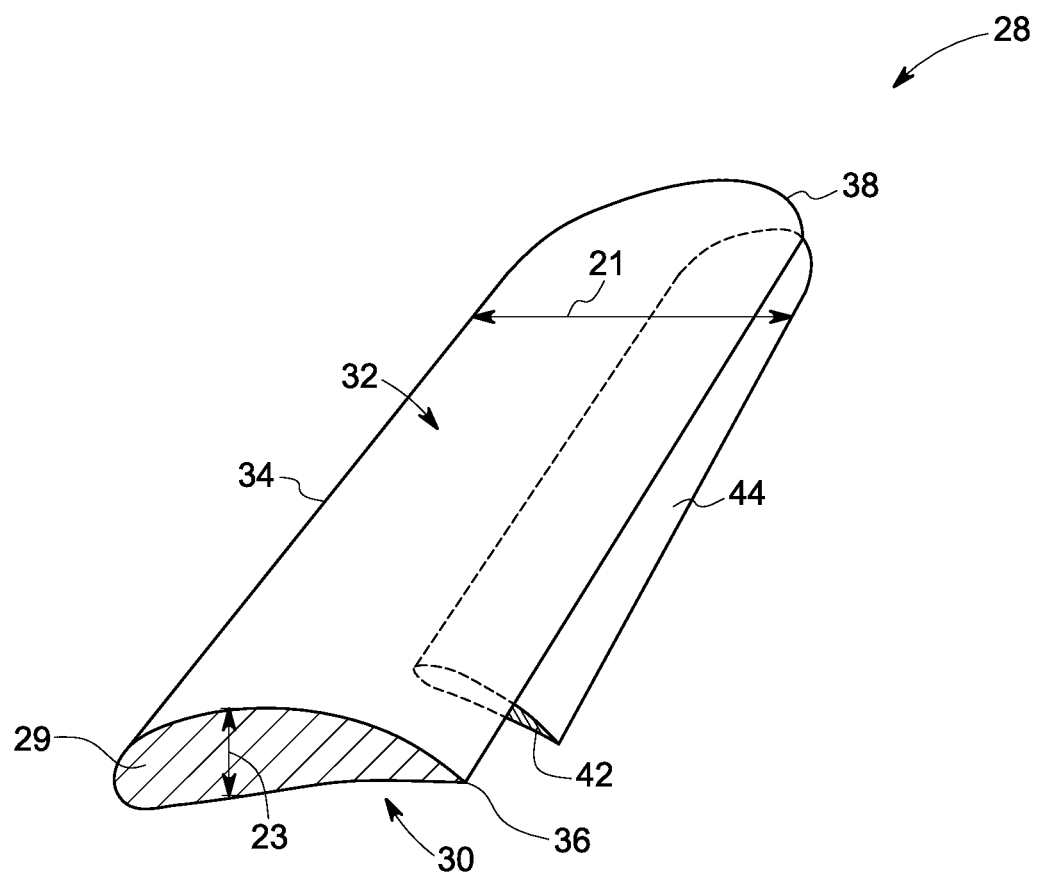
FIG. 3 shows a perspective view of a portion of a wind blade with a secondary blade body or an acoustic shield on a pressure side in accordance with an embodiment of the present invention.

FIG. 3 shows a perspective view of a portion of a wind blade 28 with the secondary blade body 40 (or acoustic shield) disposed on the pressure side 30 of the primary blade body 29 in accordance with another embodiment of the present invention. As shown, in this embodiment, the second surface 44 of the secondary blade body 40 is coupled with the primary blade body 29 on the pressure side 30. In one embodiment, the secondary blade body 40 (or acoustic shield) is coupled with at least a portion of the trailing edge of the primary blade body 29. In another embodiment, the secondary blade body 40 (or acoustic shield) may be coupled with the entire portion of the trailing edge in the span-wise direction.

Figure 4:
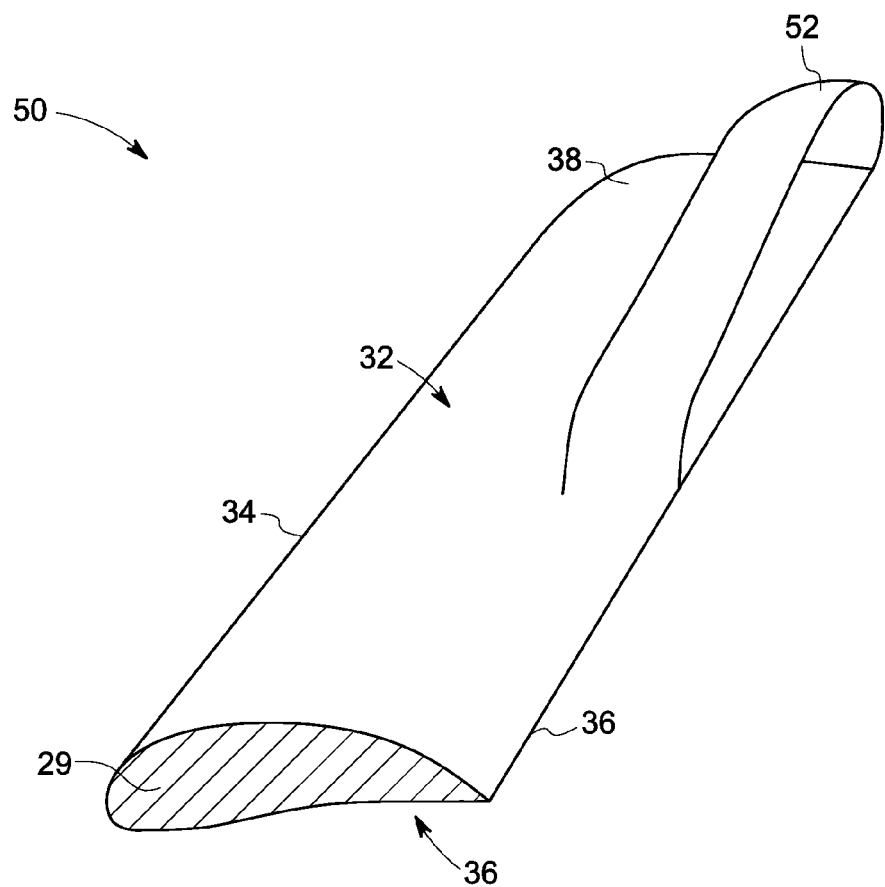
FIG. 4 shows a simplified perspective view of a section of wind blade with a secondary blade body or an acoustic shield, where the tip of the acoustic shield makes a continuous surface with the tip of the primary blade, analogous to a winglet on an aircraft fixed wing, in accordance with an embodiment of the present invention.

FIG. 4 shows a simplified perspective view of a section of a wind blade 50 with an acoustic shield 52 towards in accordance with an embodiment of the present invention. As shown in this embodiment, the acoustic shield 52 includes a secondary blade body made up of a thin shell structure that is disposed on a portion of the trailing edge 36 towards the blade tip region 38 in the span-wise direction and loops back into the wind blade 50. This results in reduced induced drag and higher aerodynamic performance of the wind blade 50. In this embodiment, the primary blade body 29 is faired with the secondary blade body at the tip region 38 for reducing the tip vortex strength of the wind blade 50.

Figure 5:
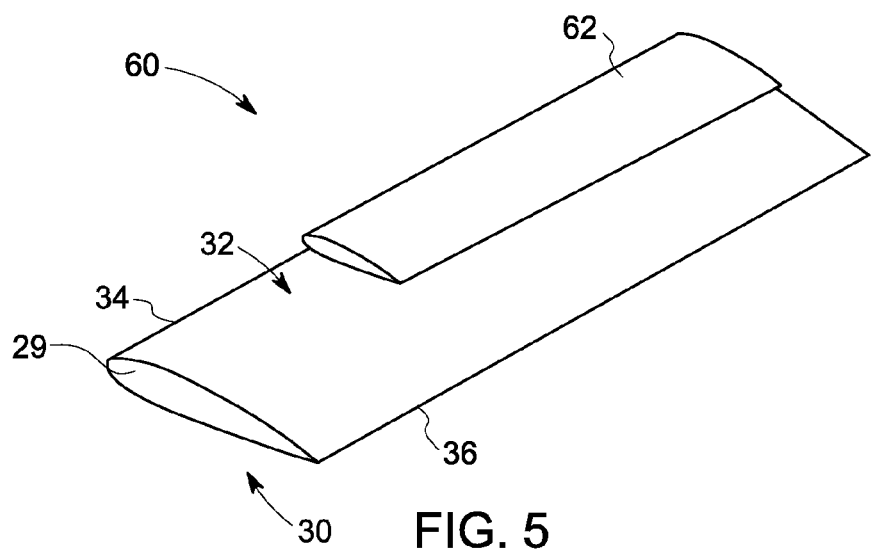
FIG. 5 is a perspective view of a portion of a wind blade with a secondary blade body or an acoustic shield on a suction side towards a leading edge in accordance with an embodiment of the present invention.

FIG. 5 is a perspective view of a portion of a wind blade 60 with a secondary blade body 62 (or acoustic shield) disposed on a suction side 32 towards a leading edge 34 in accordance with an embodiment of the present invention. In one embodiment as shown, the secondary blade body 62 (or acoustic shield) is coupled with at least a portion of the leading edge 34 of the primary blade body 29. In another embodiment, the secondary blade body 62 (or acoustic shield) may be coupled with the entire portion of the leading edge 34 in the span-wise direction of the wind blade 60.

In yet another embodiment, the secondary blade body 62 (or acoustic shield) may be disposed on a pressure side 30 towards a leading edge 34. It is to be noted that the material of the secondary blade body and the coupling of the primary blade body with the secondary blade body as discussed in embodiments of FIG. 3-5 remain similar to the embodiments discussed in FIG. 1, FIG. 2 and FIG. 3.

Figure 6:
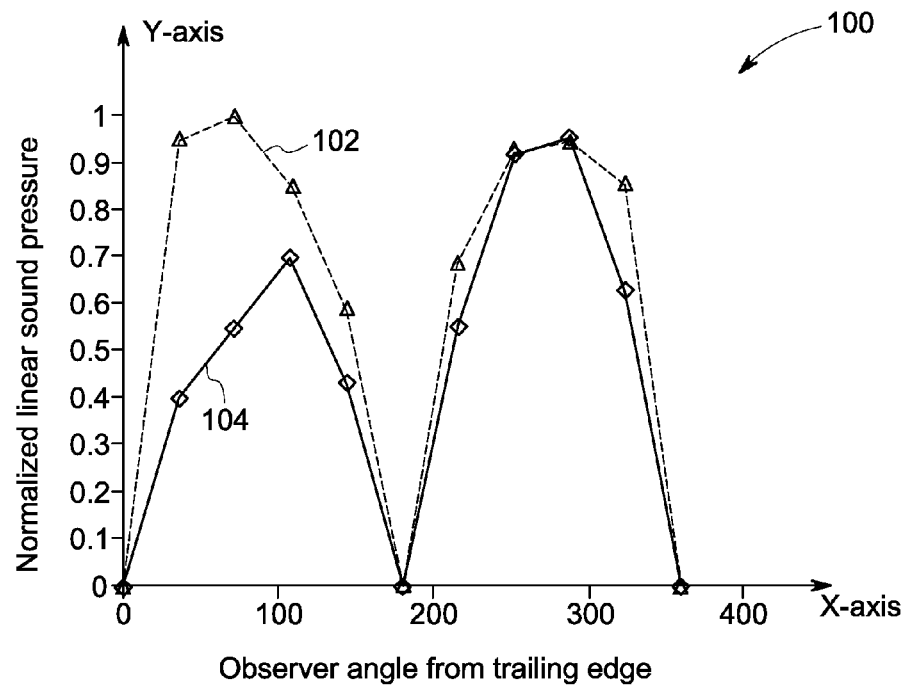
FIG. 6 shows a chart comparing acoustic directivity of a normal wind blade and a wind blade with an acoustic shield in accordance with an embodiment of the present invention.

FIG. 6 shows a plot 100 comparing acoustic directivity of a normal wind blade and a wind blade with an acoustic shield as discussed above in FIG. 1-5. The y-axis of the plot 100 shows a normalized linear sound pressure in dimensionless units. The x-axis of the plot 100 shows an observer angle from a trailing edge in degrees. The plot 100 shows a first curve 102 depicting acoustic directivity of a normal wind blade and a second curve 104 depicting acoustic directivity of the wind blade with acoustic shield disposed proximate to at least a portion of the trailing edge. The plot 100 clearly illustrates a significant reduction in sound pressure in case of the second curve 104 as compared to the first curve 102 when sound pressure is measured around the trailing edge region of the wind blades. This reduction can be of the order of 4 dB, and can also be more.

Figure 7:
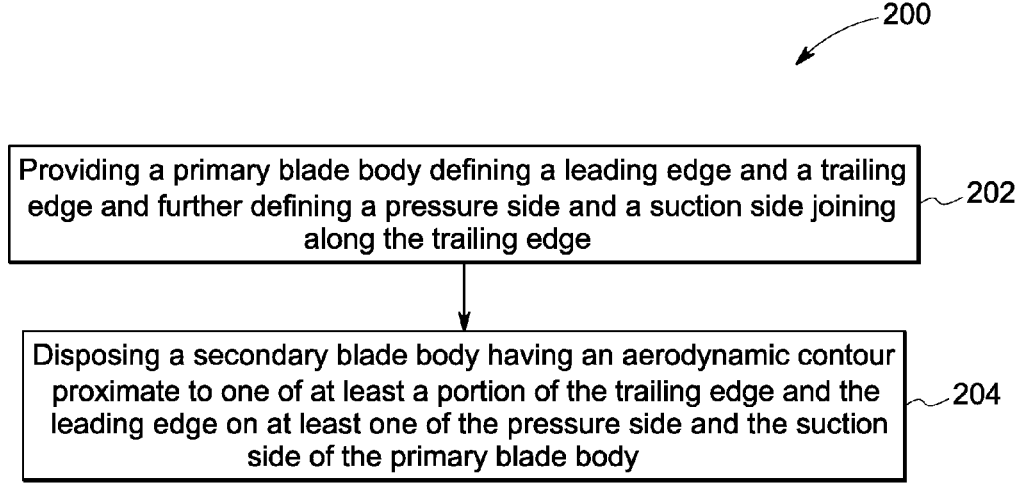
FIG. 7 is flow chart of a method of reducing noise in a wind blade in accordance with an embodiment of the present invention.

FIG. 7 is flow chart of a method 200 of reducing noise in a wind blade in accordance with an embodiment of the present invention. At step 202, the method includes providing a primary blade body defining a leading edge and a trailing edge and further defining a pressure side and a suction side joining along the trailing edge. At step 204, the method also includes disposing a secondary blade body having an aerodynamic contour proximate to one of at least a portion of the trailing edge and the leading edge on at least one of the pressure side and the suction side of the primary blade body. The method 200 also includes disposing the secondary blade body having a first surface and a second surface on the primary blade body by gluing via a plurality of stents. The method 200 further includes disposing the secondary blade body within one-third of an outer region of the primary blade body towards the tip region of the wind blade. In one embodiment, the method 200 includes fairing the secondary blade body with the tip region of the wind blade for allowing a smooth laminar flow of wind over the wind blade.

Advantageously, the present invention enables reduced noise emission from the wind blades having acoustic shields, thereby, allowing more turbine installation in a given site and consequently increasing the Annual Energy Production (AEP) of the site. This benefit is gained with a negligible change in blade overall performance, and a negligible additional structural loading on the wind turbine. The acoustic shield can be used to significantly reduce trailing edge noise, but also the noise generated at the leading edge due to turbulent inflow. Careful aerodynamic design of the shield can lead to performance improvements of the blade aerodynamic efficiency through a reduction of tip losses. This can enable higher tip speeds and thus lead to greater torque and AEP. It can be retrofitted, leading to a significant noise reduction with a minimal downtime of the wind turbine.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A wind blade comprising:
a primary blade body having an aerodynamic contour and defining a length extending from a blade root region outwards to a blade tip region, defining a leading edge and a trailing edge, and further defining a pressure side and a suction side joining along the trailing edge; and
a secondary blade body comprising an acoustic shield spaced apart from at least a portion of the trailing edge on at least one of the pressure side and the suction side of the primary blade body to allow air to flow between the primary blade body and the secondary blade body and to create a shielding effect for noise generated from the primary blade body without affecting boundary layer properties of air flowing over the aerodynamic contour of the primary blade body, wherein the secondary blade body comprises a thin shell structure disposed on the trailing edge, wherein the thin shell structure is situated in a span-wise direction with one end attached towards the blade tip region and loops back into the wind blade such that another end is attached towards the blade root region.

2. The wind blade of claim 1, wherein the secondary blade body is coupled to an outer region defined by an outwards one third of the length of the primary blade body and including the blade tip region of the wind blade.

3. The wind blade of claim 1, wherein the tip region of the wind blade is faired with the secondary blade body allowing for recovery of a tip vortex with high blade efficiency.

4. The wind blade of claim 1, wherein the secondary blade body is coupled with the primary blade body on the suction side.

5. The wind blade of claim 1, wherein the secondary blade body is coupled with primary blade body on the pressure side.

6. The wind blade of claim 1, wherein the secondary blade body is configured to be retrofitted with the primary blade body.

7. The wind blade of claim 1, wherein the secondary blade body comprises a material selected from a group consisting of metals or composite materials.

8. A wind blade comprising:
a primary blade body having an aerodynamic contour and defining a length extending from a blade root region outwards to a blade tip region, defining a leading edge and a trailing edge, and further defining a pressure side and a suction side joining along the trailing edge; and
a secondary blade body comprising an acoustic shield spaced apart from at least a portion of the trailing edge on at least one of the pressure side and the suction side of the primary blade body and configured for creating a shielding effect for noise generated from the primary blade body without affecting boundary layer properties of air flowing over the aerodynamic contour of the primary blade body, wherein the secondary blade body comprises a thickness to chord ratio in a range of 0.03 to 0.08.

9. A wind blade comprising:
a primary blade body having an aerodynamic contour and defining a length extending from a blade root region outwards to a blade tip region, defining a leading edge and a trailing edge, and further defining a pressure side and a suction side joining along the trailing edge; and
a secondary blade body comprising an acoustic shield spaced apart from at least a portion of the trailing edge on at least one of the pressure side and the suction side of the primary blade body and configured for creating a shielding effect for noise generated from the primary blade body without affecting boundary layer properties of air flowing over the aerodynamic contour of the primary blade body, wherein the secondary blade body comprises a chord-wise thickness in a range of 5% to 15% of the primary blade body.

10. A wind turbine comprising:
a plurality of wind blades, wherein each of the blade comprises:
a primary blade body having an aerodynamic contour and defining a length extending from a blade root region outwards to a blade tip region, defining a leading edge and a trailing edge, and further defining a pressure side and a suction side joining along the trailing edge; and
a secondary blade body comprising an acoustic shield having an aerodynamic contour defining a first surface and a second surface and coupled to and spaced apart from one of at least a portion of the trailing edge and the leading edge on at least one of the pressure side and the suction side of the primary blade body to allow air to flow between the primary blade body and the secondary blade body and to create a shielding effect for noise generated from the primary blade body without affecting boundary layer properties of air flowing over the aerodynamic contour of the primary blade body, wherein the secondary blade body comprises a thin shell structure disposed on the trailing edge, wherein the thin shell structure is situated in a span-wise direction with one end attached towards the blade tip region and loops back into the wind blade such that another end is attached towards the blade root region, and wherein the primary blade body is faired with the secondary blade body at the tip region for reducing a tip vortex strength of the wind blade.

11. The wind turbine of claim 10, wherein the secondary blade body is coupled with the primary blade body on the suction side or the pressure side.

12. The wind turbine of claim 10, wherein the secondary blade body is coupled to at least a portion of the trailing edge on the suction side of the primary blade body such that an edge of the secondary blade body is aft of the trailing edge.

13. The wind turbine of claim 10, wherein the secondary blade body is coupled to an outer region defined by an outwards one third of the length of the primary blade body and including the blade tip region of the wind blade.

\* \* \* \* \*